Oct. 18, 1966 P. D. FADOW ET AL 3,279,814
STEERING SYSTEM
Filed Sept. 22, 1964 2 Sheets-Sheet 1

MARTIN J. STIGLICH
PAUL D. FADOW
*INVENTORS*

BY
John R. Faulkner
Keith L. Zershling
*ATTORNEYS*

INVENTORS
MARTIN J. STIGLICH
PAUL D. FADOW
BY
John R. Faulkner
Keith L. Zerschling
ATTORNEYS

3,279,814
STEERING SYSTEM
Paul D. Fadow, Dearborn Heights, and Martin J. Stiglich, Plymouth, Mich., assignors to Ford Motor Company, Dearborn, Mich., a corporation of Delaware
Filed Sept. 22, 1964, Ser. No. 398,340
5 Claims. (Cl. 280—95)

This invention relates to a steering system for an automotive vehicle and more particularly to a steering system that includes a single-piece leaf spring functioning as the idler arm in the steering linkage.

In conventional systems of the parallelogram type, a pitman or steering arm that is coupled to the output shaft of the steering gear is pivotally attached to a link positioned for movement transverse of the vehicle. The other end of this cross link is pivotally connected to an idler arm. The idler arm is in turn pivotally attached to the frame of the vehicle through a suitable bearing member. The pitman arm and the idler arm are of substantially the same length, and form with the cross link a parallelogram-type linkage system. The cross link is connected to each of the steerable road wheels of the vehicle through suitable tie rods.

This particular arrangement of steering linkage is almost universely employed, and the idler arm is generally in the form of a U-shaped member that requires a suitable sleeve and thrust bearing where it is connected to a bracket mounted on the frame and where it is connected to the cross link. In larger vehicles it has been found that the restoring force on the steering system when it has been turned to an off-center position is not sufficient to properly return the steering wheels to the center position when the driver removes the turning force from the steering wheel. As a consequence, bushings or bearings connected to the idler arm and the bracket mounted on the frame have been employed that will impart this type of restoring force. Ordinarily, a synthetic-type rubber bushing placed under torsional stress by the turning of the steerable road wheels is used.

The present invention provides a single-piece leaf spring idler arm that is rigidly affixed to the frame or other structural member of the vehicle and to the cross link thereby eliminating one of the bearing and bushing members and also eliminating the bracket member intermediate the frame or structure member. This leaf spring is pivotally connected to the cross link by standard bearing means, and is in the neutral or unstressed position when the steerable road wheels of the vehicle and the steering linkage are in the on-center position. This leaf spring will provide proper restoring forces when the steerable road wheels are turned to either side of the vehicle. It is merely a problem of straight forward engineering design to determine the proper spring rate for this leaf spring to provide proper restoring forces.

An object of the invention is the provision of a simplified steering linkage system that provides a proper restoring force on the linkage system and steerable road wheels of an automotive vehicle.

Another object of the invention is the provision of a single-piece arm mechanism for a steering linkage in an automotive vehicle that eliminates many of the parts employed in prior art idler arm mechanisms.

Other objects and attendant advantages of the present invention may be more readily realized when the specification is considered in connection with the attached drawings, in which.

Figure 1:
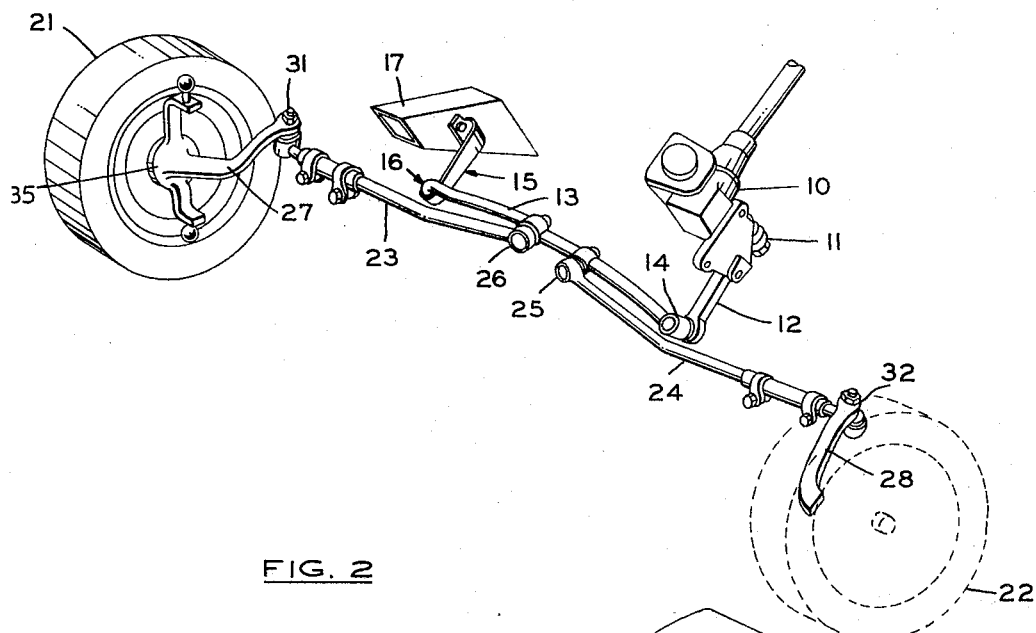
FIGURE 1 shows an automotive steering linkage incorporating the present invention.

Referring now to the drawings in which like reference numerals designate like parts throughout the several views thereof, there is shown in FIGURE 1 a steering gear 10 having an output shaft 11 coupled to a pitman or steering arm 12. The pitman or steering arm 12 is coupled to a transverse or cross link 13, positioned in a transevrse or cross direction to the longitudinal axis of the vehicle, by a standard pivotal bearing connection 14.

The cross link 13 is also connected to the idler arm 15 of the invention by means of a standard pivotal bearing connection 16. As will be explained in more detail later, the idler arm 15 comprises a single leaf spring member that is rigidly attached to the frame or other structural member 17 of the vehicle through suitable fastening means which may comprise a pair of through bolts.

The transverse or cross link 13 is connected to the steerable road wheels 21 and 22 of the automotive vehicle by means of tie rods 23 and 24 that are pivotally connected to the cross link 13 by pivotal bearing connections 25 and 26 and by means of knuckle arms 27 and 28 that are pivotally connected to the tie rods 23 and 24 by pivotal bearing connections 31 and 32. It is to be understood that the knuckle arms are suitably attached to the king pin assemblies 35 that rotatably support the steerable road wheels 21 and 22.

Figure 2:
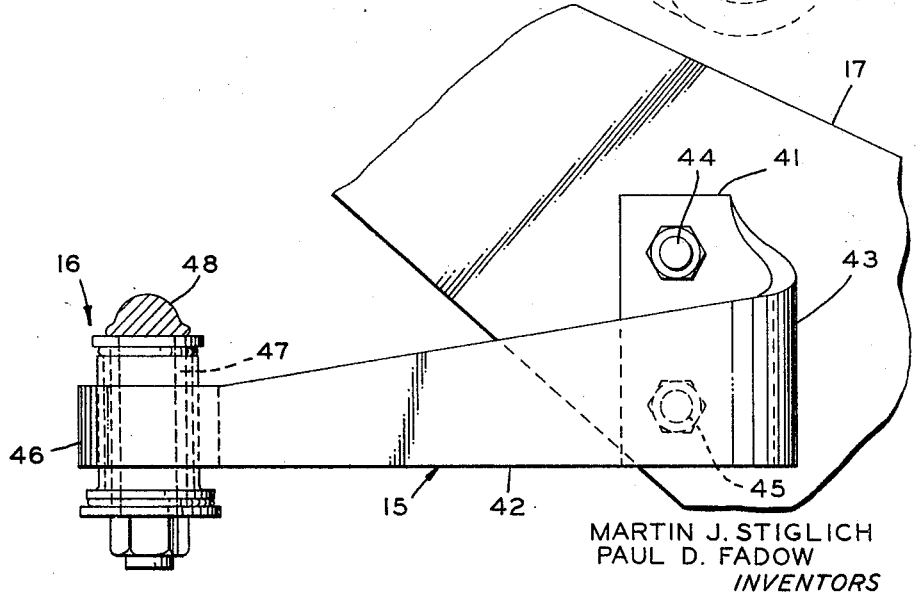
FIGURE 2 is an enlarged view of the idler arm of the invention coupled to the frame and cross link of the linkage system.
Figure 3:
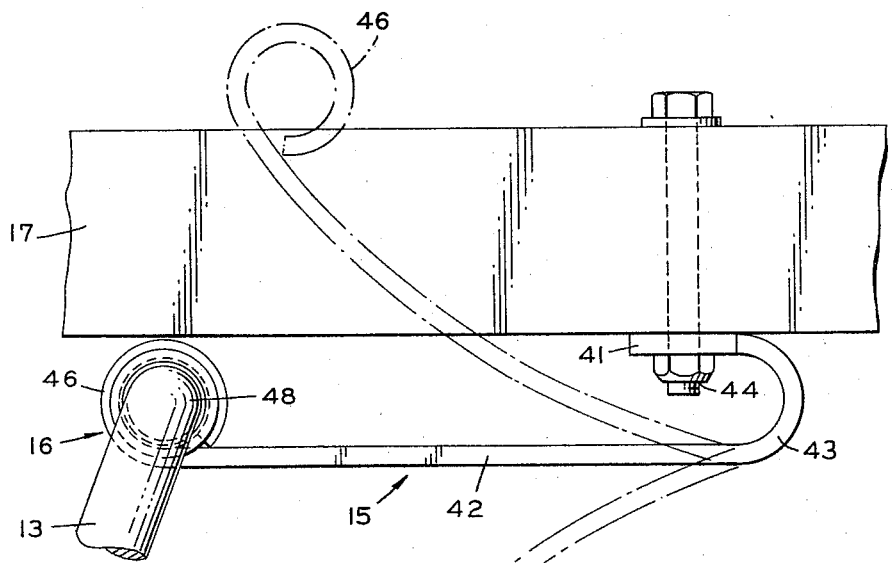
FIGURE 3 is a top plan view of the mechanism shown in FIGURE 2.

As shown more specifically in FIGURES 2 and 3, the single-piece leaf spring idler arm 15 and the frame member 17 are arranged so that the movement of the idler arm due to the movement of the pitman or steering arm 12 and cross link 13, will not cause interference between the idler arm 15 and the frame 17. As shown in FIGURES 2 and 3, in one form of the invention the single-piece leaf spring idler arm 15 comprises a single-piece U-shaped flat metal member that has a short leg 41, a long leg 42, and an intermediate U-shaped connecting portion 43. The short leg 41 is affixed to a longitudinally extending structural or frame member 17 by means of a pair of through bolts 44 and 45. The end of the long leg 42 may have a circular rolled portion 46 that is positioned about a standard bushing or pivotal bearing 47. This bushing or bearing member 47 forms part of the pivotal connection 16 and rotatably journals pin 48 that is affixed to transverse or cross link 13.

Figure 5:
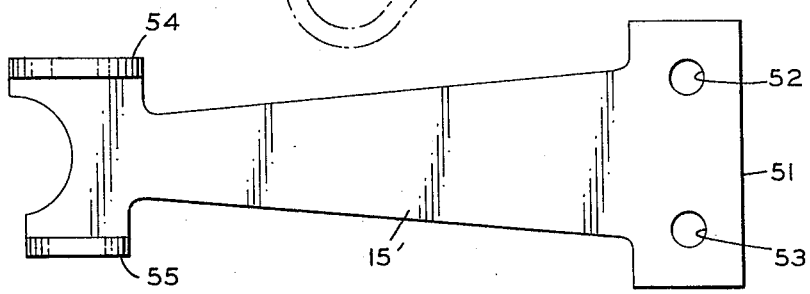
FIGURE 5 is a side elevational view of the leaf spring idler arm shown in FIGURE 4.
Figure 4:
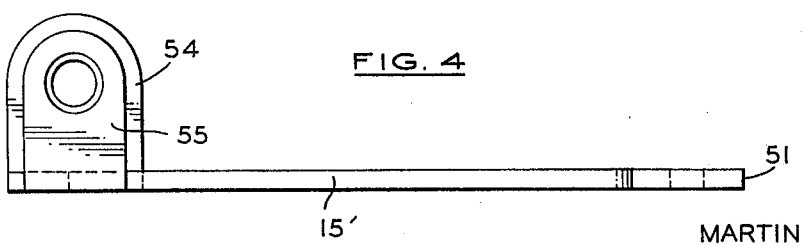
FIGURE 4 is a top plan view of another embodiment of the leaf spring idler arm of the present invention.

An alternate embodiment of the leaf spring is shown in FIGURES 4 and 5. In this alternate embodiment, the idler arm 15 takes the form of a single-piece flat leaf spring that is affixed to the frame 17 of the vehicle by any suitable means, for example through bolts 44 and 45 of the type shown in FIGURES 2 and 3. For this purpose, an enlarged end 51 is provided having a pair of apertures 52 and 53 for the reception of the bolts 44 and 45. The other end of the flat leaf spring member may include a pair of spaced flanges 54 and 55 extending radially from the body portion of the spring for proper attachment to the bearing or bushing 47.

In the operation of the steering system employing the single-piece leaf spring idler arm of the present invention, the single-piece leaf spring idler arm 15 is positioned in its unstressed condition, as shown in the middle position in FIGURE 3, when the steering gear 10, the steering linkage and the steerable road wheels 21 and 22 are positioned in the on-center position where the steerable road wheels are pointed in the straight-ahead position.

When the vehicle operator moves the steering wheel of the vehicle in the direction to cause the steering linkage to move the steerable road wheels in one direction, the single-piece leaf spring idler arm 15 will be flexed or deformed along the arc shown in the upper portion of FIGURE 4 and will come into the upper position shown in FIGURE 3 when the steerable road wheels 21 and 22 are turned to the maximum extent in that direction. On the other hand, if the steering gear 10 is moved in the other direction by the vehicle operator and the steerable road wheels 21 and 22 are moved in the other direction, the single-piece leaf spring idler arm 15 will be flexed or deformed along the arc shown in the lower portion of FIGURE 4 and will come into the lower position shown when the steerable road wheels 21 and 22 are turned to the maximum extent in that direction.

It will be seen, therefore, that the single-piece leaf spring idler arm 15 causes a restoring force to be placed on the steering system including the steering gear 10 and the road wheels 21 and 22, through the linkage system described by applying a force to the transverse or cross link 13 in a direction opposite to the direction the link moved to cause the steering movement. This force will be proportional to the angular position of the steerable road wheels off the off-center or straight-ahead position thus placing a proper restoring force on the steering linkage and steerable road wheels of the vehicle. This same action will be provided by the alternate embodiment of the single-piece idler arm bracket shown in FIGURES 4 and 5.

It can be readily appreciated that the single-piece leaf spring idler arm 15 of the invention eliminates the need for the conventional bracket attached to the frame with its pivotal connection pivotally connecting the bracket to a conventional idler arm. This single-piece idler arm also provides a proper restoring force on the steering system of the vehicle that is lacking in the conventional idler arm and bracket arrangement.

It is to be understood that this invention is not to be limited to the exact construction shown and described, but that various changes and modifications may be made without departing from the spirit and scope of the invention as defined in the appended claims.

What is claimed as new is:

1. In a steering linkage for an automotive vehicle having a structural member, a single-piece idler arm and bracket comprising a leaf spring having one end affixed to said structural member, said linkage including a link, the other end of said leaf spring being pivotally attached to one end of said link, said leaf spring being positioned to flex in the direction of movement of said link.

2. In a steering linkage for an automotive vehicle having a structural member, a single-piece idler arm and bracket comprising a leaf spring having one end affixed to said structural member, said linkage including a cross link extending substantially transverse of said vehicle, the other end of said leaf spring being pivotally attached to one end of said cross link, said leaf spring being positioned to flex in the direction of movement of said cross link.

3. A steering system for an automotive vehicle comprising a frame, a steering gear, a pair of steerable road wheels, a parallelogram type linkage system interconnecting said steering gear and said steerable road wheels, said parallelogram type linkage including an idler arm constructed of a single piece leaf spring affixed to said frame at one end and rotatably coupled to said linkage system at the other end, said single piece leaf spring being positioned in its unstressed condition when said steerable road wheels are in a center or straight ahead position and exerting a centering force on said linkage system and steerable road wheels when said steerable road wheels and parallelogram linkage are positioned on either side of the center position.

4. A steering system for an automotive vehicle comprising a structural member, a steering gear, a pair of steerable road wheels, a parallelogram type linkage system interconnecting said steering gear and said steerable road wheels, said parallelogram type linkage including an idler arm constructed of a U-shaped single piece leaf spring having a first leg and a second leg, means rigidly connecting said first leg to said structural member and means pivotally connecting said second leg to the remainder of said linkage system, said U-shaped single piece leaf spring being positioned in its unstressed condition when said steerable road wheels are in a center position and exerting a centering force on said linkage system and steerable road wheels when said steerable road wheels and parallelogram linkage are positioned on either side of the center position.

5. A steering system for an automotive vehicle comprising structural member, a steering gear, a pair of steerable road wheels, a parallelogram type linkage system interconnecting said steering gear and said steerable road wheels, said parallelogram type linkage including an idler arm constructed of a flat single piece leaf spring, means rigidly affixing one end of said flat single piece leaf spring to said structural member and means pivotally connecting the other end of said flat single piece leaf spring to the remainder of said linkage system, said flat single piece leaf spring being positioned in an unstressed condition when said steerable road wheels are in a center position and exerting a centering force on said linkage system and said steerable road wheels when said steerable road wheels are positioned on either side of the center position.

References Cited by the Examiner

UNITED STATES PATENTS

| | | | |
|---|---|---|---|
| 1,267,289 | 5/1918 | Tracy | 280—94 |
| 1,837,516 | 12/1931 | Baits | 280—95 |
| 2,578,645 | 12/1951 | Ricks. | |
| 2,660,908 | 12/1953 | French | 280—95 X |

KENNETH H. BETTS, *Primary Examiner.*